(12) United States Patent
Stukenholtz et al.

(10) Patent No.: US 7,524,242 B2
(45) Date of Patent: Apr. 28, 2009

(54) COLLECTING KERNELS OF CORN AND COBS

(75) Inventors: Ty E. Stukenholtz, Nebraska City, NE (US); Jay E. Stukenholtz, Nebraska City, NE (US)

(73) Assignee: Cobco Manufacturing, Inc., Nebraska City, NE (US)

( * ) Notice: Subject to any disclaimer, the term of this patent is extended or adjusted under 35 U.S.C. 154(b) by 0 days.

(21) Appl. No.: 11/788,880

(22) Filed: Apr. 23, 2007

(65) Prior Publication Data

US 2008/0261668 A1  Oct. 23, 2008

(51) Int. Cl.
*A01D 17/04* (2006.01)

(52) U.S. Cl. ..................................................... 460/115

(58) Field of Classification Search .................. 460/96, 460/143, 115, 131, 145, 903, 102, 100, 79; 56/202, 16.6, 13.3; 15/340.4, 340.3
See application file for complete search history.

(56) References Cited

U.S. PATENT DOCUMENTS

| | | | | |
|---|---|---|---|---|
| 3,623,298 A | * | 11/1971 | Hitzhusen | 56/252 |
| 3,976,084 A | * | 8/1976 | Weber | 460/14 |
| 4,154,047 A | * | 5/1979 | Quick | 56/13.9 |
| 4,188,160 A | * | 2/1980 | Corbett et al. | 406/58 |
| 4,295,325 A | * | 10/1981 | Cannavan | 56/13.9 |
| 4,455,814 A | * | 6/1984 | Kienholz | 56/126 |
| 4,584,824 A | * | 4/1986 | Hiyamuta | 56/13.9 |
| 4,896,486 A | * | 1/1990 | Lundahl et al. | 56/10.2 E |
| 4,930,981 A | * | 6/1990 | Walker | 415/119 |
| 4,996,829 A | * | 3/1991 | Saitoh et al. | 56/13.3 |
| 5,224,327 A | * | 7/1993 | Minoura et al. | 56/13.3 |
| 5,245,817 A | * | 9/1993 | Hohnl | 56/13.3 |
| 5,256,106 A | * | 10/1993 | Shrawder | 460/39 |
| 5,519,987 A | * | 5/1996 | Voss et al. | 56/14.6 |
| 5,761,891 A | * | 6/1998 | Ferrari | 56/6 |
| 5,941,768 A | * | 8/1999 | Flamme | 460/114 |
| 6,358,141 B1 | * | 3/2002 | Stukenholtz et al. | 460/100 |
| 6,539,693 B2 | * | 4/2003 | Krone et al. | 56/16.6 |
| 6,669,558 B1 | * | 12/2003 | Wolters et al. | 460/14 |
| 6,974,384 B2 | * | 12/2005 | Schmidt | 460/114 |
| 6,976,914 B2 | * | 12/2005 | Matousek et al. | 460/114 |
| 6,991,537 B2 | * | 1/2006 | Sahr et al. | 460/12 |
| 7,025,673 B2 | * | 4/2006 | Schmidt et al. | 460/114 |
| 7,028,457 B2 | * | 4/2006 | Schmidt | 56/16.6 |
| 2008/0000207 A1 | * | 1/2008 | De Vries et al. | 56/1 |

FOREIGN PATENT DOCUMENTS

EP  1380204 A1 *  1/2004
GB  2219722 A  * 12/1989

* cited by examiner

*Primary Examiner*—Árpád Fábián-Kovács
(74) *Attorney, Agent, or Firm*—Brett Trout

(57) ABSTRACT

A combine is provided with an improved system for collecting agricultural material, such as stover, from an agricultural field. The combine is provided with an impeller to assist in driving stover through a duct and into a container. The combine separates and cleans the stover and any seed before directing the stover and seed into separate containers provided on the combine.

19 Claims, 3 Drawing Sheets

COLLECTING KERNELS OF CORN AND COBS

BACKGROUND OF THE INVENTION

1. Field of the Invention

The present invention relates in general to a system and method for harvesting agricultural material and, more particularly, to a system and method for harvesting corncobs from an agricultural field.

2. Description of the Prior Art

The present invention relates to an improvement on the system and method described in U.S. Pat. No. 6,358,141, which is incorporated herein by reference. Agricultural combines typically combine the harvesting and threshing processes into a single vehicle. Combines may be fit with different front ends, or headers, to collect different types of agricultural material, such as chaff, stover, switchgrass seed, grass seed, grass stems, wildflower seeds, leaves, flowers, other seeds, as well as other organic matter. Combines fit with corn headers collect ears of corn comprising kernels of corn on cobs. The ears are typically covered with husks and other types of chaff. The ears are coupled to stalks. The combine grabs the ears, typically separating the ears from the stalks, but sometimes uprooting and processing some or all of the stalk.

Prior art combines intake this material and separate the ears of corn from the stalks, husks and remaining chaff. The combine then takes each ear of corn and uses a thresher to separate the kernels of corn from the cob. Thereafter, the stover, including the shelled cobs, and remaining chaff are ejected back onto the agricultural field. The corn kernels thereafter move to a storage container. The prior art has typically taught methods for retaining the grain and discarding the chaff. With the advent of ethanol production plants, however, which can utilize starch other than grain, it has become desirable to collect some of all of the stover.

While most types of chaff can be converted into some type of energy, much of the chaff is too "fluffy" to justify its collection for subsequent use. That is to say that the density of this material is too light in comparison to its energy content to justify its collection. Stover, such as corn cobs, however, have high density and high energy content, making it desirable to collect for subsequent energy generation. While vehicles can obviously be constructed to collect both corn kernels and corn cobs, it would be desirable to provide a method for adapting the thousands of existing combines to collect both the corn kernels and high density stover.

One drawback associated with collecting kernels of corn and the cobs, is that most prior art systems operate to collect the grain directly on the combine, but require the cobs be collected in another vehicle, such as a grain wagon pulled behind the combine during harvest. The use of a grain wagon in association with the combine complicates maneuvering of the combine.

U.S. Pat. No. 6,358,141 describes a method for harvesting, cleaning and storing both corn kernels and whole cobs on a combine without the necessity of a pull behind wagon. This method and system has proven advantageous. It would be desirable, however, to provide a method for facilitating provision of corn cobs to a supplemental container and for reducing clogging associated with corn cob collection. The difficulties encountered in the prior art discussed herein above are substantially eliminated by the present invention.

SUMMARY OF THE INVENTION

In an advantage provided by the present invention, a system and method for harvesting chaff is provided which separates cobs from other chaff for collection.

Advantageously, this invention provides a system and method for harvesting corn cobs which reduces corn cob loss.

Advantageously, this invention provides a system and method for collecting chaff which reduces clogging.

Advantageously, this invention provides a system and method for collecting stover which reduces the amount of low density material collected with the stover.

Advantageously, this invention provides a system and method for collecting corn cobs which may be retrofitted onto existing agricultural collection equipment.

In an advantage provided by this invention, an agricultural material collection system is provided which includes means for moving corn cobs from a field to an auger. The auger feeds the corn cobs to a duct. A blower is provided to move air through the duct to a storage container. An impeller is provided at least partially within the duct. As the corn cobs move from the auger to the impeller, the impeller propels the corn cobs through the duct and into the storage container.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
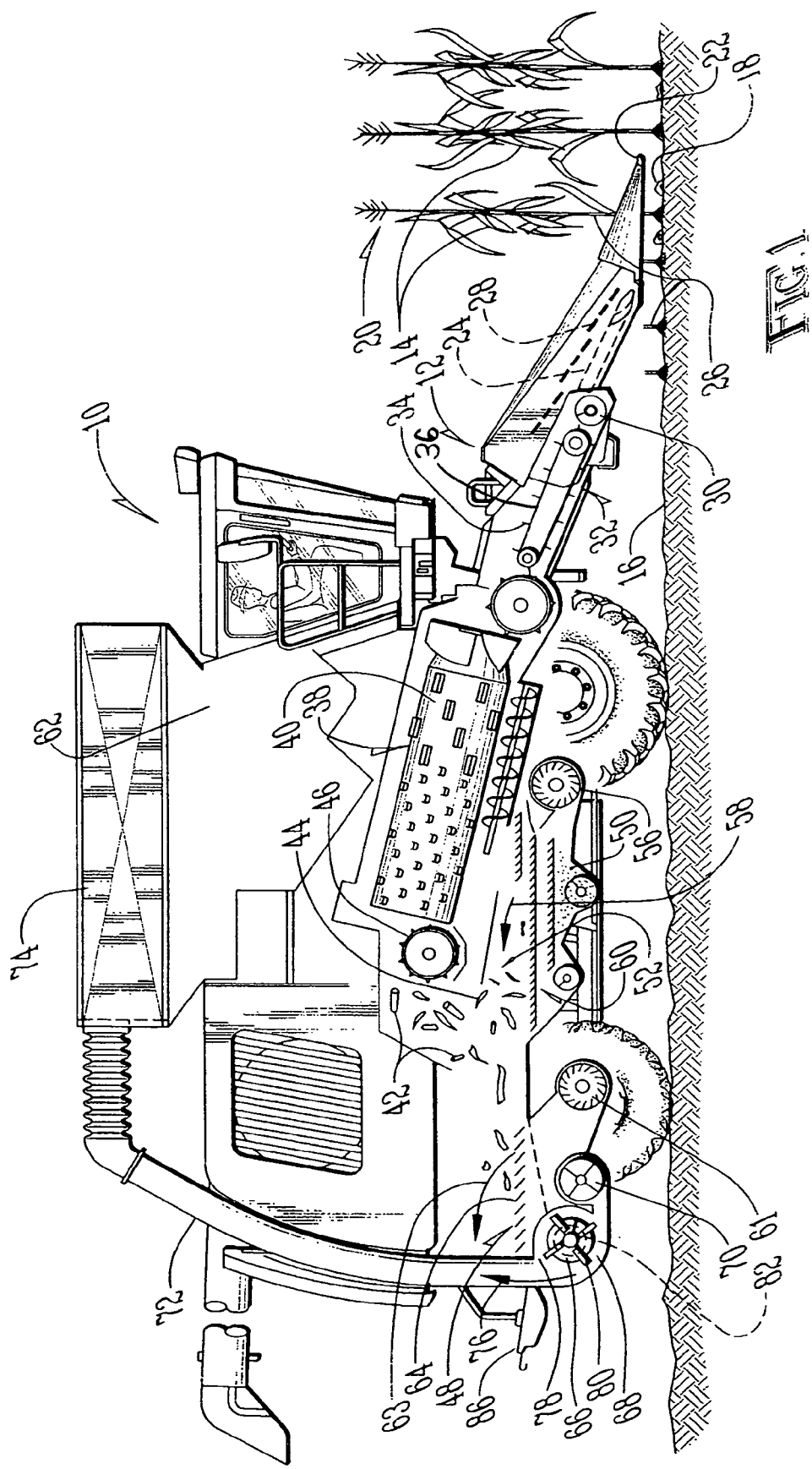
FIG. 1 illustrates a left elevation in partial cross-section of a combine system of the present invention.

A combine according to the present invention is shown generally as (10) in FIG. 1. The combine (10), such as a John Deere model STS combine, is provided with a header (12) which, in the preferred embodiment, is a corn header. The header (12) may, of course, be a platform header, windrow header or pick-up type header if it is desired to utilize the present invention to collect non-grain agricultural material other than corncobs.

The header (12) is preferably adjusted for harvesting of the desired crop. As shown in FIG. 1, the header is positioned low enough to pick up the lowest ears (14) of corn, but high enough to avoid having the header (12) contact the agricultural field (16), rocks (18) or other non-plant material in the agricultural field (16) which could cause damage to the header (12). If the corn plants (20) are bent, or if the combine (10) is to be used in an agricultural field (16) where the corn kernels have already been harvested and the corn stover (42) have already been ejected onto the agricultural field (16), the header may be lowered to gather this material into the combine (10). The combine (10) is preferably provided with gathering points (22) which run between the rows of crops to direct the corn plants (20) into the stock rolls (24). As the combine (10) moves through the agricultural field (16), the corn plants (20) are directed by the gathering points (22) toward the stalk rolls (24).

The stalk rolls (24) grab the stalks (26) and pull them downward until the ears (14) contact the stripper plates (28) which separate the ears (14) from the stalks (26). The header (12) is also provided with a cross auger (30) which directs the ears (14) to the center of the header (12), where the ears (14) are conveyed into the combine (10) by the feeder house (32) in a manner such as that known in the art. The feeder house (32) includes a plurality of metal ribs (34) connected to chains (36) that move the ears (14) into the threshing unit (38).

The ears (14) enter the threshing unit (38) where they are shelled by single or multiple rotary cylinders (40). The rotary cylinder (40) discharges stover (42) which includes shelled cobs and other chaff (44) into a transfer beater (46), which tosses the stover (42) and chaff (44) onto a rear sieve (48). Shelled corn (50) and small chaff (52) drop from the rotary cylinder (40) onto a bottom sieve (60). A clean grain fan (56) supplies a flow of air (58) through the front sieve (60). A clean stover fan (61) supplies a flow of air (63) through the rear sieve (48). The flow of air (58) is preferably sufficient to cause separation of the chaff (44) and small chaff (52) from the corn kernels (50). Having a higher density than the chaff (44) and (52), the corn kernels (50) fall through the front sieve (60), and are conveyed by auger to a lower container (62) in a manner such as that known in the art. The flow of air (58) and oscillation of the front sieve (60) moves the chaff (44) to the rear sieve (48).

Chaff (44) which is too dense to be removed by the flow of air (58), moves across the oscillating rear sieve (48) into a cross auger (66). Means, such as those known in the art, are utilized to oscillate the sieves (48) and (60). The sieves (48) and (60) are provided with surface features (64) such as barbs or similar features known in the art to "walk" the stover (42) and chaff (44) along the sieves (48) and (60) as the sieves (48) and (60) oscillate.

Figure 2:
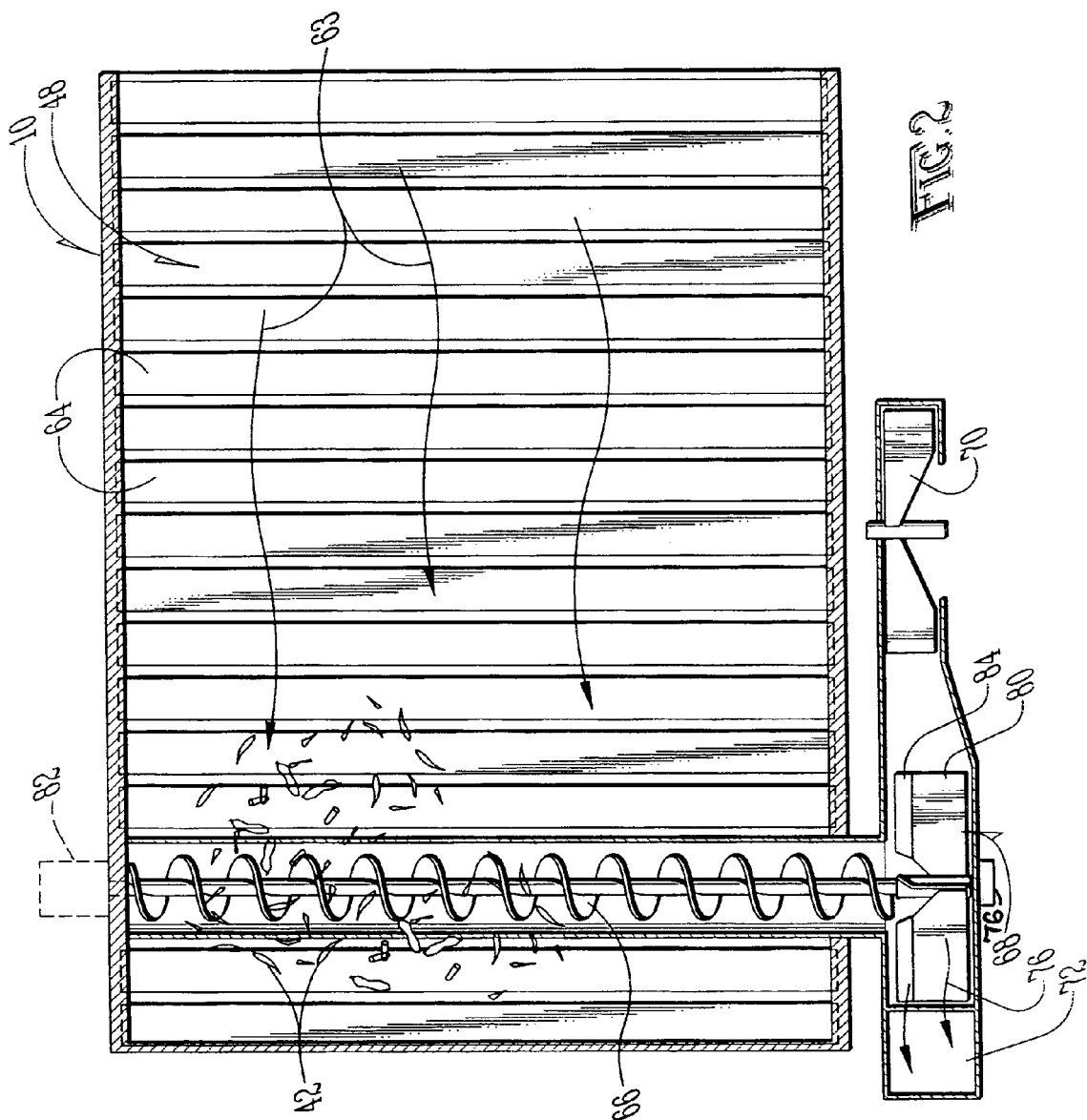
FIG. 2 illustrates a top elevation of the separating means of the combine of the present invention.

As shown in FIGS. 1-2, the cross auger (66) delivers the stover (42) to an impeller (68). A blower fan (70) is coupled to a duct (72) which feeds into an upper container (74) for the collection and storage of the stover (42). While the upper container (74) may be of any suitable construction, configuration or connection desired, in the preferred embodiment the upper container (74) is positioned over the lower container (62) to allow an operator (not shown) to monitor the upper container (74) and to position the added weight over one of the strongest portions of the combine (10). Alternatively, the upper container (74) may be a wagon pulled behind or along side the combine (10).

As shown in FIG. 1, the impeller (68) is positioned at least partially within the duct (72). As the blower fan (70) directs airflow (76) through the duct (72), the airflow (76) generates a venturi (78). The low pressure area generated by the venturi (78) at the point of the impeller (68) allows atmospheric pressure to force stover (42) from the cross auger (66) into the duct (72). As the stover (42) enter the duct (72), the blades (80) provided on the impeller (68) strike the stover (42) and propel the stover (42) upward through the duct (72). While the impeller (68) may be rotated at any desired speed, in the preferred embodiment, the impeller (68) is driven at a speed of between five hundred to twenty-five hundred revolutions per minute, and more preferably one thousand to two thousand revolutions per minute. In the preferred embodiment, the impeller (68) is driven at a speed of approximately eight hundred revolutions per minute by the hydraulic system (82) associated with the combine (10). The speed may vary according to the size of the impeller (68) and the speed needed to overcome the tendency of the blower fan (70) to force air back onto the cross auger (66).

Figure 3:
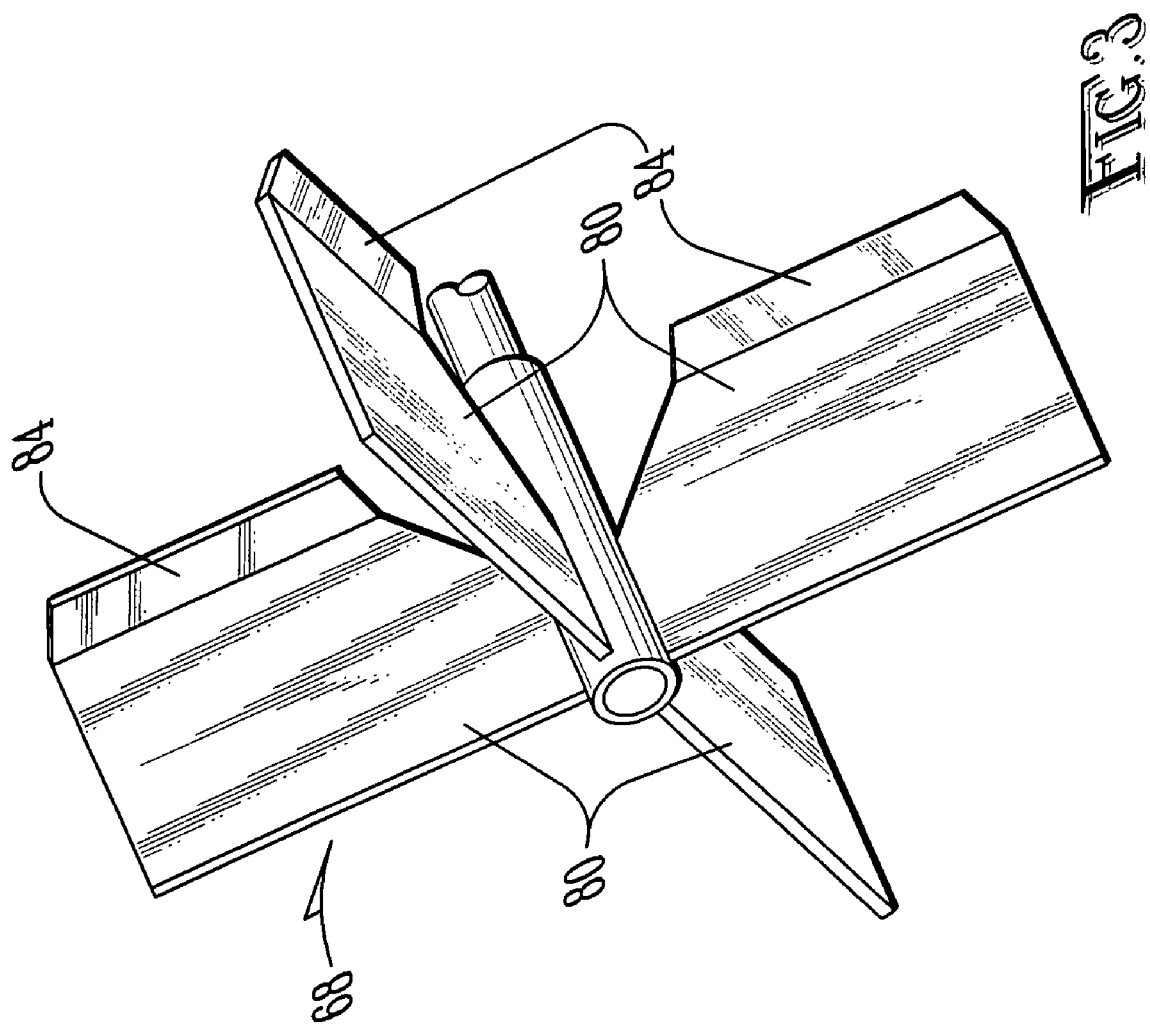
FIG. 3 illustrates a side perspective view of the impeller of the present invention.

As shown in FIG. 3, the blades (80) of the impeller (68) are provided with lips (84) to prevent the stover (42) from falling off the edge of the blades (80) before the blades (80) have an opportunity to strike the stover (42) and propel them upward through the duct (72). FIGS. 2 and 3. It should be noted that the impeller (68) may be of any desired configuration and be provided with any number of blades (80), including a single blade, in any desired configuration or orientation.

Light chaff (44) blown by the fan (61) exits the combine (10) onto a spreader (86) which distributes the chaff (44) onto the agricultural field (16).

Although the invention has been described with respect to a preferred embodiment thereof, it is to be understood that it is not to be so limited since changes and modifications can be made therein which are within the full, intended scope of this invention as defined by the appended claims. For example, the impeller may be located only slightly or entirely within the duct, and the impeller may be of any desired configuration, provided with any number of blades and any desired configuration. Additionally, the impeller can be run by any power source at any desired speed. The impeller may be of any desired diameter or dimensions.

Furthermore, the combine (10) can be configured to direct all of the agricultural material into the upper container (74). This configuration is particularly useful for the collection of material like grass and seek, which does not have to be separated, and for sticky material like sorghum.

What is claimed is:

1. An agricultural material collection system comprising:
   (a) an agricultural vehicle;
   (b) an agricultural material collector;
   (c) a blower having an outlet;
   (d) a duct defining an interior in fluid communication with said outlet of said blower;
   (e) an impeller;
   (f) wherein a majority of said impeller is positioned within said duct;
   (g) a material container positioned for receipt of material exiting said duct;
   (h) wherein said blower is positioned so as not to contact agricultural material contacting said impeller; and
   (i) wherein said blower and said impeller motivate agricultural material in the same direction.

2. The agricultural material collection system of claim 1, wherein said impeller comprises:
   (i) an axle;
   (ii) a first paddle coupled to said axle and extending across first axial point along said axle;
   (iii) a second paddle coupled to said axle and extending across said first axial point along said axle; and
   (iv) a third paddle coupled to said axle and extending across said first axial point along said axle.

3. The agricultural material collection system of claim 1, further comprising means for rotating said impeller at a speed of at least three hundred revolutions per minute.

4. A combine comprising:
   (a) a frame;
   (b) a motive source coupled to said frame;
   (c) a stover harvester;
   (d) a blower;
   (e) an impeller comprising:
      (i) an axle;
      (ii) a first paddle coupled to said axle and extending across first axial point along said axle;
      (iii) a second paddle coupled to said axle and extending across said first axial point along said axle; and (iv) a third paddle coupled to said axle and extending across said first axial point along said axle;
(f) wherein said blower is positioned downstream from said impeller in a manner so as to avoid contact with stover contacting said impeller;
(g) a stover storage container; and
(h) means for directing said air flow from said impeller to said storage container.

5. The combine of claim 4, further comprising:
(a) an ear stripper;
(b) a thresher; and
(c) means for conveying corn cobs from said thresher onto said impeller.

6. A combine comprising:
(a) a header;
(b) a thresher;
(c) means for feeding agricultural material from said header to said thresher;
(d) a blower;
(e) an agricultural material container;
(f) means for directing an airflow from said blower to an outlet;
(g) an impeller positioned upstream of said blower and at least partially within said air flow;
(h) an auger having an outlet in feeding proximity to said impeller;
(i) first drive means for rotating said auger at a first speed;
(j) second drive means for rotating said impeller at a second speed, wherein said second speed is greater than said first speed; and
(k) wherein said impeller is positioned in a manner to prevent agricultural material contacting said impeller from contacting said blower.

7. The mobile agricultural transport of claim 6, wherein said agricultural material container is positioned for receipt of said agricultural material.

8. The mobile agricultural transport of claim 6, further comprising means for moving the combine.

9. The mobile agricultural transport of claim 6, wherein said thresher comprises means for threshing seeds from said agricultural material.

10. The mobile agricultural transport of claim 6, further comprising means for ejecting a portion of said agricultural material from the combine.

11. The mobile agricultural transport of claim 6, further comprising a sieve positioned to receive material from said thresher.

12. The mobile agricultural transport of claim 11, further comprising means for blowing air through said sieve.

13. The mobile agricultural transport of claim 12, wherein said thresher comprises means for threshing seeds from said agricultural material.

14. The mobile agricultural transport of claim 13, further comprising means for ejecting a portion of said agricultural material from the combine.

15. A cob blower comprising:
(a) a blower;
(b) a duct coupled to said blower;
(c) an impeller comprising:
    (i) an axle;
    (ii) a paddle coupled to said axle along no more than three hundred fifty degrees of a circumference of said axle;
(d) wherein said impeller is positioned upstream from said blower and at least partially within said duct;
(e) wherein said blower is positioned so as not to contact material contacting said impeller; and
(f) a bin positioned for receipt of material from said duct, wherein said bin has a capacity of between about one hundred liters and fifty thousand liters.

16. The cob blower of claim 15, further comprising means for moving said paddle at a speed slower than air moving through said duct.

17. The cob blower of claim 16, further comprising a scoop coupled to said paddle.

18. The cob blower of claim 15, further comprising an auger positioned to deliver cobs to said impeller.

19. The cob blower of claim 15, further comprising a combine coupled to said cob blower.

* * * * *